Fig. 1

June 4, 1940.  G. W. GOLDNER  2,203,330
SECTIONALIZING CUTOUT
Filed Sept. 28, 1936  4 Sheets-Sheet 2

INVENTOR
GEORGE W. GOLDNER
By E. W. Harrington
ATTORNEY

June 4, 1940.   G. W. GOLDNER   2,203,330
SECTIONALIZING CUTOUT
Filed Sept. 28, 1936    4 Sheets-Sheet 3

INVENTOR
GEORGE W. GOLDNER
BY E. M. Harrington
ATTORNEY

Patented June 4, 1940

2,203,330

UNITED STATES PATENT OFFICE 2,203,330

SECTIONALIZING CUTOUT

George W. Goldner, St. Louis, Mo., assignor to James R. Kearney Corporation, St. Louis, Mo., a corporation of Missouri Application September 28, 1936, Serial No. 102,848

19 Claims. (Cl. 200—118)

This invention relates generally to electrical cutout devices and more specifically to an improved series sectionalizing cutout adapted particularly for use with series street lighting circuits, the predominant object of the invention being to provide an improved device of this type which is capable of performing its intended function in an improved and highly efficient manner.

An ordinary series street lighting circuit of 40 kw. capacity is made up of approximately fifteen miles of conductor and in these circuits open circuits occur from time to time, usually during bad weather conditions. It is not a simple matter to patrol fifteen miles of series circuit, particularly on a stormy night, and locate and repair an open circuit, and this renders such faults both costly to the power companies and hazardous to the distribution maintenance men whose duties require them to keep the circuits in operating condition.

In order to eliminate much of the trouble heretofore encountered in maintaining street lighting circuits in working condition the improved series sectionalizing cutout disclosed herein was devised. The predominant feature of the operation of this device is that it breaks long circuits into relatively small component sections, any one of which will be automatically isolated from the remainder of the circuit when an open circuit occurs in the component section. Because of this arrangement the length of the circuit to be patrolled to locate an open circuit may be reduced by any desired amount, depending on the number of cutouts installed.

A distinct feature of the construction and arrangement of the improved device is that the device is completely housed when in its operating condition, the housing including a door which carries a fuse tube that provides a gap and a fuse link arranged in series and connected across the loop circuit. Also this door carries switch blades which normally complete the connections from the main circuit to the loop circuit. Because of this improved arrangement an open circuit occurring in the loop circuit will cause the voltage across the gap to immediately increase to the open circuit voltage of the constant current transformer. The gap then sparks over, establishing a circuit through the fuse link which blows, and when this happens the fuse tube drops, releasing the door, which swings from its closed to its open position carrying with it, and out of their normal operating positions, the fuse tube and the switch blades so as to electrically isolate the loop circuit from the main circuit. Simultaneous with the dropping of the fuse tube an auxiliary switch operates to bridge the main circuit and maintain it in operating condition.

Figure 1:
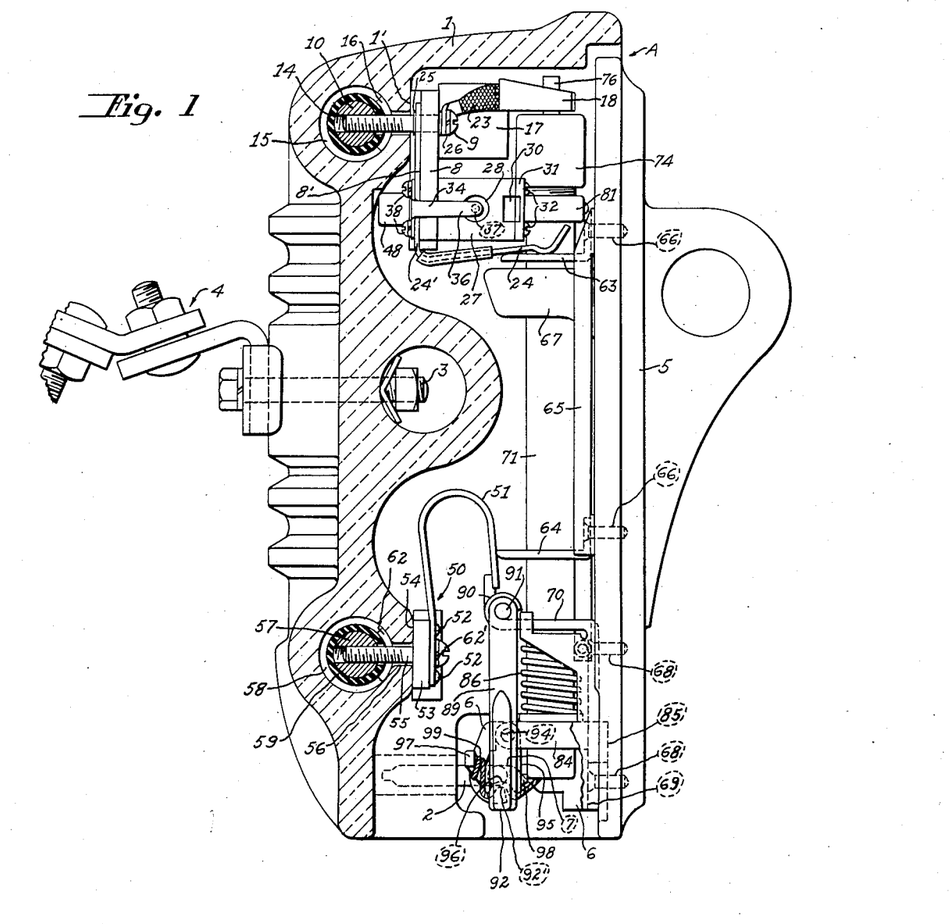
Fig. 1 is a vertical section elevation of the improved device, the housing being shown in section and a part of the hanger being broken away.
Figure 2:
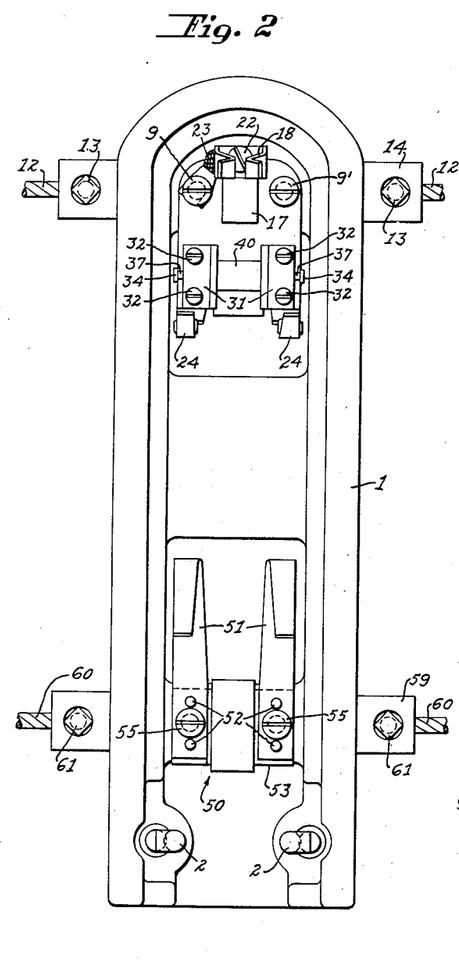
Fig. 2 is a front elevation of the housing of the improved device with the door removed therefrom.

Referring now to the drawings, wherein is shown for the purpose of illustration, merely, one embodiment of the invention, A designates generally the improved cutout device. The cutout device A comprises a housing 1 which preferably is formed of porcelain, said housing adjacent to its lower end being provided with hinge elements 2 that are embedded in the porcelain of the housing as shown in Figs. 1 and 2. The housing has fixed to it, through the instrumentality of a bolt 3, a suitable hanger 4 which serves in an obvious manner to attach the device to a support. The housing 1 includes a door 5 which is formed of Bakelite or other suitable material, and is provided with hinge elements 6 which are provided with openings 7 adapted to receive the hinge elements 2 of the body portion of the housing in a manner to provide for hingedly supporting the door on the body portion of the housing.

Arranged in the upper portion of the housing 1 is an upper contact assembly which includes a base element 8 formed of Bakelite or other suitable electrical insulating material. The base element 8 at its upper end portion is seated against an inner face 1' of the housing 1 and a pair of screws 9 and 9' are employed for securing said base element in place (see Figs. 4 and 6). The screws 9 and 9' are seated in terminal elements 10 and 10' which are spaced apart and insulated from each other by an insulating block 11, and electrical conductors 12 forming the incoming and outgoing leads of the main circuit with which the device is associated are extended into openings formed in the terminal elements 10 and 10' and are electrically and mechanically secured to said terminal elements by set screws 13. The terminal elements 10 and 10' and the insulating block 11 are enclosed within a sleeve 14 formed of Bakelite or other suitable material and the wall of this sleeve is provided with apertures through which the screws 9 and 9' and the set screws 13 extend. The upper terminal assembly comprising the sleeve 14, the terminal elements 10 and 10' and the intermediate insulating block 11 are disposed in an opening 15 formed in and extended transversely of the housing 1 and arcuate spacers 16 are interposed between forward portions of the sleeve and forward portions of the wall of the opening so as to center the terminal assembly within said opening 15.

Secured to the upper portion of the base element 8 is a block 17 to which is attached a resilient element 18 that serves, as will presently appear herein, as a contact element and as a latch for securing the door 5 in its closed position. This block 17 is formed of Bakelite or other suitable insulating material and it is fixedly attached to the base element 8 by a screw 19. Also a layer of material 20 is interposed between the base element 8 and the block 17, this material preferably being a varnish having a gilsonite base and being intended to exclude moisture from between said parts. The head of the screw 19 which secures the block 17 to the base element 8 is disposed in an aperture formed in said base element and this aperture is filled with sealing wax 21 or other suitable material which serves to exclude moisture and prevents unintended rotation of the screw.

Figure 6:
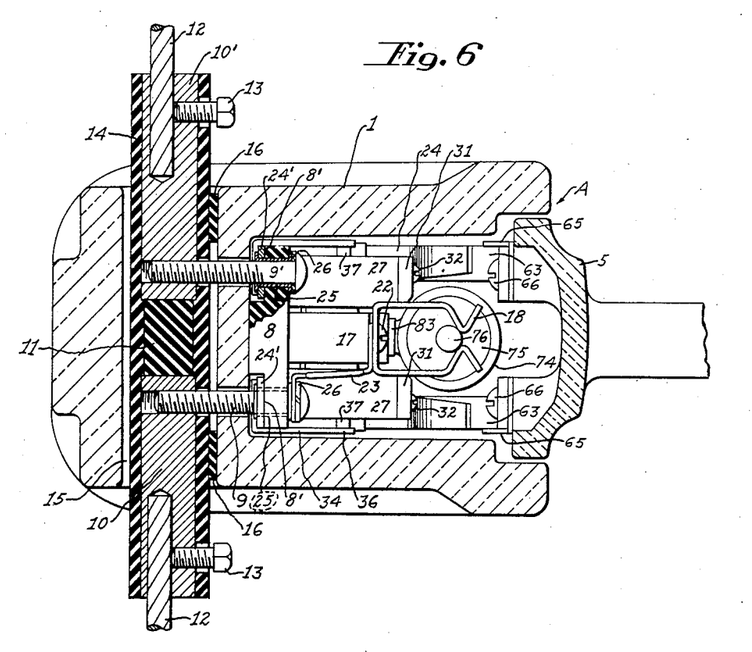
Fig. 6 is a horizontal section on line 6—6 of Fig. 4.

The resilient element 18 is shaped as shown to the best advantage in Fig. 6 and said resilient element is secured to the block 17 by a screw 22. Also the resilient element is electrically connected to the screw 9 by a connection 23 (see Figs. 1 and 6), the opposite end portions of said connection being provided with apertures through which the screw 22 and the screw 9 pass.

Secured to the base element 8 and arranged so that they extend forwardly from the lower end thereof are the upper contacts 24 of the improved device, these contacts being spaced apart transversely of the housing as shown to the best advantage in Fig. 2. At the rear ends of the forwardly extended portions of the upper contacts 24 said contacts are provided with upwardly extended portions 24' which contact with rear faces 8' of the base element 8, these faces 8' being offset forwardly from the rear face of the main body of the base element. Adjacent to the upper end of each of the portions 24' an aperture is formed therethrough which is arranged in registration with a corresponding aperture formed through the base element 8 and extended through these registered apertures is a fastening device in the form of a sleeve 25 having upset opposite end portions providing flanges which contact with the forward face of the base element and with the rear face of the portion 24' of each upper contact (see Fig. 6). Through the sleeve 25 associated with the portion 24' of one of the upper contacts the screw 9 passes and through the sleeve 25 associated with the portion 24' of the other upper contact the screw 9' passes, each of the screws 9 and 9' having a lock washer 26 associated therewith immediately beneath the head thereof. The forward ends of the upper contacts are provided with downwardly and forwardly curved and upwardly extended portions as shown in Fig. 1.

Figure 5:
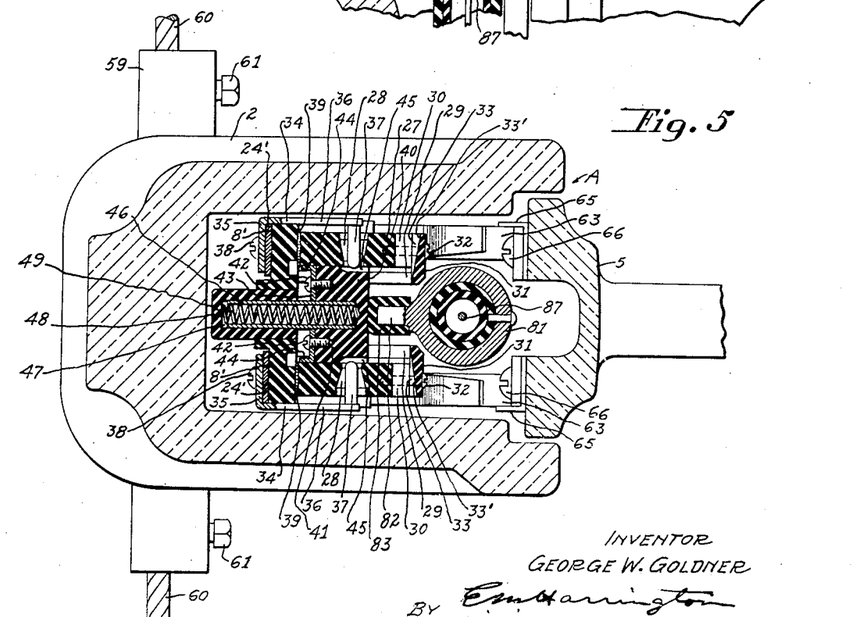
Fig. 5 is a horizontal section on line 5—5 of Fig. 4.

Extended forwardly from the forward face of the base element 8 is a pair of spaced members 27 which are preferably formed of horn fiber. These members are provided with apertures 28 formed therethrough which are largely of tapered shape as shown to the best advantage in Fig. 5. The members 27 are provided with grooves 29 which extend horizontally and longitudinally of said members, and the tapered apertures 28 lead into these grooves. Also at the forward end of each member 27 a rectangular opening 30 is provided which extends from the inner to the outer face of the member. The rectangular opening 30 of each member 27 is closed by an end element 31 which is secured to the forward end face of the member by screws 32, and these end elements are each provided with an opening 33 having an inclined wall 33' which communicates with the rectangular opening of the associated member 27.

Secured to the base element 8 at opposite sides thereof are spring arms 34. These spring arms include portions 35 which contact with the rear faces of the portions 24' of the upper contacts 24, and forwardly extended portions 36 which at their forward ends are provided with pins 37 which extend into the tapered apertures 28 formed in the members 27. The spring arms are secured to the base element by screws 38 which pass through apertures in the portions 35 thereof and in the portions 24' of the upper contacts, these screws 38 also passing through apertures formed through the base element and being seated in apertures formed in the members 27 and thereby serve to secure the spring arms 34 and the lower portions of the upper contacts 24 to the base element and fixedly attach the members 27 to said base element. In order to exclude moisture from the joints between the members 27 and the base element 8, layers 39 of varnish having a gilsonite base are interposed between the adjacent faces of said parts.

Arranged for sliding movement in the grooves 29 of the members 27 is a switch element 40 which comprises a block 41 formed of horn fiber to which is attached at its rear face by screws 42 a metallic plate 43, said metallic plate being provided with flange portions 44 at its opposite ends. The block 41 of the switch element 40 is provided at its opposite sides with grooves 45 which extend rearwardly from the forward face of the block where said grooves are open, to a point intermediate the forward and rear faces of the block. The block 41 of the switch element 40 is provided with a sleeve 46 which extends rearwardly from said block and is projected into an opening 47 formed in a member 48 supported by and secured to the base element 8. The opening 47 is closed at its rear end by the rear wall of the member 48 and an expansible and contractile coil spring 49 is disposed within the sleeve 46 with its opposite ends contacting respectively with a face of the block 41 and the forward face of the rear wall of the member 48 so that the switch element 40 is urged forwardly of the grooves 29 of the members 27 by said coil spring. As is shown to the best advantage in Fig. 5 the end elements 31 serve as stops which close the forward ends of the grooves 29 and thereby limit forward movement of the switch element 40 in response to force exerted thereagainst by the coil spring 49.

Arranged in the lower portion of the housing 1 is the lower contact assembly 50 of the improved device (see Figs. 1 and 2). This assembly includes a pair of transversely spaced resilient contacts 51 which are secured by fastening devices 52 to insulating means 53 fixed to the housing at a face 54 thereof. The insulating means 53 are secured in place by screws 55 which extend through apertures formed through the contacts 51 and pass through apertures formed through the insulating means 53, these screws passing also through apertures 56 formed in portions of the housing and being seated in terminal elements 57 arranged in a transversely extended opening 58 formed in the housing. The lower terminal assembly of which the terminal elements 57 form parts is constructed and arranged just as is the upper terminal assembly illustrated in Fig. 6; that is to say the terminal elements 57 are enclosed within an insulating sleeve 59 and conductors 60 forming the incoming and outgoing leads of the loop circuit are extended into apertures formed in said terminal elements and are secured in place therein by set screws 61. Also arcuate spacers 62 are interposed between portions of the sleeve 59 and portions of the wall of the opening 58 so as to center the sleeve within the opening. Obviously the screws 55 act as conductors for conducting electrical energy from the terminal elements to the resilient contacts 51 inasmuch as metallic lock washers 62' contact with said resilient contacts and with the heads of the screws 55.

Secured to the door 5 of the housing 1 of the improved device is a pair of transversely spaced angle elements 63 with which the upper contacts 24 contact when the door is in a closed position, and secured to said door at lower points thereof is a pair of transversely spaced angle elements 64 with which the lower contacts 51 contact when the door is in a closed position. The angle elements 63 and the angle elements 64 are electrically connected by switch blades 65 which are disposed at opposite sides of the door, screws 66 being employed for securing said angle elements and said switch blades in electrical contact with each other and for attaching said parts to the door.

It is obvious that when the door 5 is in the closed position electrical energy will flow from the conductors 12 by way of the terminal elements 10 and 10' and screws 9 and 9' to the upper contacts 24, from said upper contacts by way of the angular elements 63, switch blades 65 and angular elements 64 to the lower contacts 51, and from the lower contacts by way of the screws 55 and terminal elements 57 to the conductors 60.

Formed on the door 5 is an inwardly projected extension 67 in which a vertically extended opening 67' is formed and secured by screws 68 to the lower portion of the door is a bracket 69 having a horizontally arranged portion 70 in which a similar opening is formed. It is to be noted that one of the switch blades 65 is electrically and mechanically connected to the bracket 69 at 65' in Fig. 3 and also the hinge elements 6 of the door are parts of the bracket 69. Mounted in the openings mentioned is a tube 71, which preferably comprises a pair of tubular elements arranged one within the other, the inner tubular element being formed of horn fiber and the outer tubular element being formed of Bakelite or other suitable material.

The upper end of the tube 71 is externally screwthreaded and mounted on this end of the tube is a head structure which includes an internally screw threaded cap 72 that is screwed on the screwthreaded upper end of the tube, the top wall of the cap being provided with an upwardly projected extension 73. The cap 72 is also externally screwthreaded and said cap is screwed into the lower portion of an internally screwthreaded sleeve 74 which is formed of Bakelite or other suitable electrical insulating material, said sleeve preferably extending slightly below the lower end of the cap and the exposed lower edge of the cap preferably being coated with varnish or other suitable material so as to exclude moisture therefrom and to prevent ionized gas or metal vapor from contacting with said lower edge of cap. Screwed into the upper portion of the sleeve 74 is a disk 75 having a centrally located opening formed therethrough. This opening receives a short rod which is pressed into place in the opening under pressure so that a portion of said rod extends upwardly from the disk to provide a finger 76 while another portion 77 extends downwardly from said disk. The lower end of the portion 77 is preferably rounded and this rounded lower end is spaced from the top face of the extension 73 on the cap 72 to provide a gap 78. By pressing the rod in place to the proper degree the extent of this gap may be accurately set. The extension 73 has fixed thereto a short fibre sleeve 79 which extends slightly above the top of said extension so as to embrace the gap 78, the wall at the top of said sleeve 79 being chamfered to provide a tapered opening within the upper portion of the sleeve. Also the spacing of the disk 75 and the cap 72 is maintained by an inner sleeve 80 which is located between said parts and within the sleeve 74.

At a point immediately below the head structure thereof the tube 71 has fixed thereto a collar 81 which is provided with an extension 82 on which a cap 83 formed of fiber or other suitable material is mounted. This collar is so arranged that the cap 83 thereof contacts with the forward face of the block 41 of the switch element 40 when the door is in the closed position so as to move said switch element rearwardly against the action of the coil spring 49.

Figure 3:
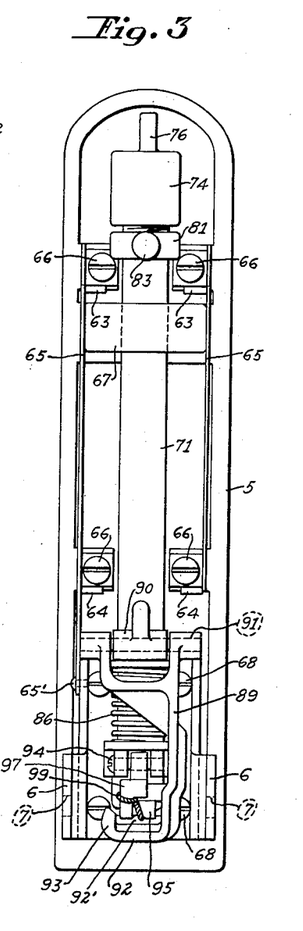
Fig. 3 is a view looking toward the inner face of the door of the device showing the fuse tube, switch blades and other parts associated therewith.
Figure 4:
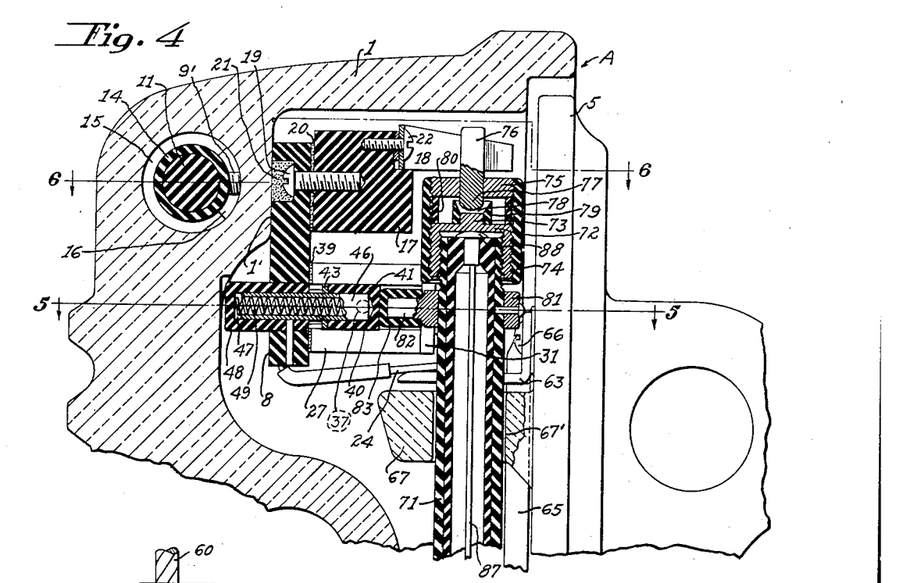
Fig. 4 is an enlarged fragmentary section of the upper portion of the device showing the door in its closed position.

Secured to the tube adjacent to its lower end is an element 84 which is provided with an extension 85 that is projected into a vertical slot formed in the vertical portion of the bracket 69 and an alined vertically extended groove formed in the door 5, and interposed between said element 84 and the horizontal portion 70 of the bracket 69 is an expansible coil spring 86. The coil spring tends to move the tube downwardly but in the normal fusing position of the device such movement is opposed by a fuse link 87 that extends through the tube, said fuse link being provided with a head 88 at its upper end which is seated between the top face of the tube and the inner face of the top wall of the cap 72 as shown in Fig. 4. When the device is in its normal operative position the lower end portion of the fuse link, which is extended from the open lower end of the tube, is engaged by a pair of elements so as to prevent downward movement of the tube in response to pressure exerted by the coil spring 86. One of these elements is a downwardly extended arm 89, which as shown in Fig. 3 includes an upper bifurcated portion that embraces an eye portion 90 formed at the inner end of the horizontal portion 70 of the bracket 69. The pivotal connection between the arm 89 and the horizontal portion of the bracket 69 is provided by a pin 91 which extends through the outer bearing portion of the bifurcated part of the arm, and through the eye 90. At the lower end of the arm 89 a substantially hook-shaped portion is provided, this hook-shaped portion being produced by a lower, laterally extended portion 92 which is provided at its outer end with an upwardly projected extension 93. The upper portion of the laterally extended portion 92 of the arm 89 is tapered as shown by dotted lines at 92' in Fig. 1.

The element 84 which is mounted on the lower portion of the tube 71 is in the form of a split collar having outwardly extended ears through which a fastening device 94 is extended for drawing said ears together so as to clamp the element on the tube, and pivotally connected to this element is a toggle member 95. A portion of the toggle member is interposed between the ears of the element 84 and the fastening device 94 extends through an opening formed through this portion of the toggle member so as to pivotally attach the toggle member to the element 84. The toggle member 95 is provided with a curved seat 96 at its lower end, and said member is provided with an extension 97 which extends upwardly and inwardly relative to the housing when the device is in its normal operative position. Also the toggle member is provided with an abutment 98 adapted to contact with the tube when the device is in its normal operative position.

When the device is in its normal operating position the lower end of the fuse link 87 extends out of the open lower end of the tube and passes between the tapered upper portion of the lateral part 92 of the arm 89 and the curved seat 96 of the toggle member 95 as shown by dotted lines in Fig. 1, the outer end portion of the fuse link being twisted about the extension 97 of the toggle member 95 as shown at 99 in Figs. 1 and 3. The downward force exerted against the tube by the coil spring 86 tends to break the toggle connection produced by the toggle member 95 and the arm 89 and this causes the fuse link to be tensioned. Thus the substantially vertically disposed arm 89 in engagement with the toggle member 95 through the portion of the fuse link interposed between these elements holds the tube 71 in its elevated position against the action of the coil spring 86, and the fuse link prevents the toggle connection produced by the toggle member 95 and the arm 89 from breaking inwardly of the housing to permit the tube to move downwardly in response to force exerted by the coil spring 86. However when the fuse link 87 is ruptured in the operation of the device the restraint on the toggle produced by the toggle member 95 and the arm 89 is removed and said toggle member and arm are permitted to swing inwardly about their pivots to break the toggle whereupon the tube 71 moves downwardly in response to downward pressure exerted against the tube by the coil spring 86.

When the device is in its normal operating position the door 5 is closed and this causes the switch blades 65 to provide direct electrical connection between the upper terminals to which the incoming and outgoing leads of the main series circuit are connected, and the lower terminals to which the incoming and outgoing leads of the loop circuit are connected. The closed condition of the door also moves the switch element 40, which is part of an auxiliary switch, rearwardly so that the side flanges 44 of the plate 43 of said switch element are held out of contact with the pins 37 mounted on the spring arms 36 (see Fig. 5), such rearward maintenance of the switch element 40 being accomplished by contact of the cap 83 carried by the collar 81 on the tube 71 with said switch element.

Now, if with the door of the device closed and the device otherwise in the operative position an open circuit occurs in the loop circuit the voltage across the gap 78 immediately increases to the open circuit voltage of the constant current transformer. The gap, which is calibrated to break down at a voltage higher than the loop circuit and lower than the open circuit voltage of the constant current transformer, then sparks over thus establishing a circuit through the fuse link 87, arm 89, bracket 69 and one of the switch blades 65 to a lower contact 51. The fuse link then ruptures and the restraint on the toggle produced by the toggle member 95 and the arm 89 is relieved by rupture of the fuse link and said toggle breaks inwardly of the housing, thereby permitting the tube to move downwardly in response to force exerted thereagainst by the coil spring 86. Downward movement of the tube withdraws the finger 76 at the top of the tube from the latch provided by the resilient element 18 and the door 5, which is overbalanced outwardly with respect to its hinge elements, swings outwardly and downwardly to its open position. This outward movement of the door is aided also by the lower contacts 51 which are formed of spring material and normally exert outward force against the door when it is in the closed position. When the door swings to its open position as described the switch blades 65 are withdrawn from their normal operative positions whereby the upper and lower contacts are no longer connected and the loop circuit is completely isolated from the main circuit.

When the tube drops and before the door moves outwardly to its open position the cap 83, moves downwardly away from the switch element 40 of the auxiliary switch and the coil spring 49 moves said switch element forwardly until the side flanges 44 of the plate 43 thereof contact with the pins 37 carried by the spring arms 36. These spring arms are electrically connected directly to the incoming and outgoing leads of the main circuit and contact between the plate 43 and the pins 37 provide a straight through connection for the main circuit which is closed thereby and hence is unaffected by the electrical isolation of the loop circuit.

The auxiliary switch of which the switch element 40 forms a part, and which provides the main circuit connection when the device operates to isolate the loop circuit, is designed to permit manual operation as a disconnect. In other words, if for any reason it is desired to disconnect a loop circuit while the circuit is energized, this may be done by merely pulling the door 5 of the device open. Also the loop circuit may be again connected into the main circuit by merely closing the door 5, and in neither case will there be any arcing. An important feature of the invention is the provision for extinguishing any arc which might be produced when the plate 43 of the switch element 40 is moved into and out of contact with the pins 37 of the spring arms 36. This feature involves producing the spaced members 27 and the block 41 from horn fiber which in the presence of the heat of an electric arc gives off gas which tends to extinguish the arc. Also the openings 28, the openings produced by the combined apertures 30 and 33 of the spaced members 27 and the end elements 31, and the grooves 45 in the switch element 41 provide passageways for the escape outwardly of this gas from between the spaced members 27 so as to avoid any chance of a short circuit because of the presence of the gas.

Figure 7:
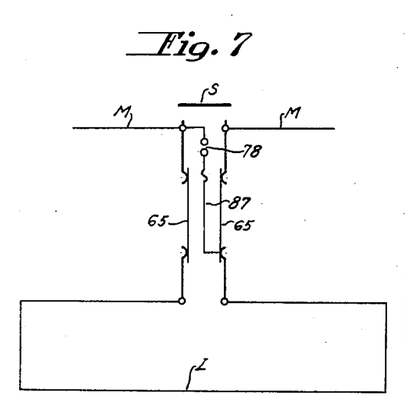
Fig. 7 is a diagrammatical view illustrating the device in association with a main circuit and a loop circuit and showing the device in the normal operative position.
Figure 8:
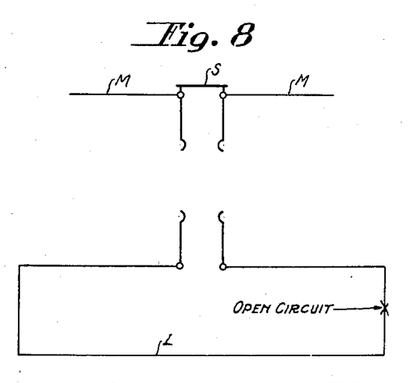
Fig. 8 is a view similar to Fig. 7 but showing the device in the alternative operating position as when the loop circuit is isolated.

In Figs. 7 and 8 the device is illustrated diagrammatically in association with a main and a loop circuit, the main circuit in each view being designated by the reference character M and the loop circuit being designated by the reference character L. Fig. 7 illustrates the device as it appears when the door is in the closed position, the switch blades 65, the gap 78, and the fuse link 87 being shown in their normal operative positions. In Fig. 7 the auxiliary switch S which closes the main circuit when the loop circuit is isolated electrically from the main circuit by dropping out movement of the door of the device is shown out of electrical connection with the main circuit, said auxiliary switch being held in this position by the door when said door is in the closed position as has been already explained herein. In Fig. 8, however, the device is shown as it appears when the door has dropped out, the loop circuit being isolated from the main circuit by withdrawal of the switch blades 65 from their effective positions and the auxiliary switch S is shown in its position where it closes and completes the main circuit.

Reference is made to an application filed on May 20, 1935, in the names of Francis J. McCluskey and George W. Goldner, Serial No. 22,411, and an application filed on February 8, 1937, in the names of Francis J. McCluskey and George W. Goldner, Serial No. 124,548, which matured into United States Patent No. 2,114,745, wherein is shown and claimed matter shown but not claimed in the present application.

I claim:

1. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sealed chamber located at one end of said tube and in alinement therewith, and energy-conducting elements extended into said sealed chamber and spaced apart therein to provide an air gap within the sealed chamber which is in series with said fusible element, said air gap being adapted to break down on a predetermined voltage to cause flow of current through said fusible element which ruptures said fusible element.

2. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sleeve fixedly mounted on said tube at an end thereof and in alinement therewith, means cooperating with the wall of said sleeve to provide a sealed chamber within said sleeve, and energy-conducting elements extended into said sealed chamber and spaced apart therein to provide an air gap within said sealed chamber which is in series with said fusible element, said air gap being adapted to break down on a predetermined voltage to cause flow of current through said fusible element which ruptures said fusible element.

3. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sleeve fixedly mounted on said tube at an end thereof and in alinement therewith, means cooperating with the wall of said sleeve to provide a sealed chamber within said sleeve, and energy-conducting elements extended into said sealed chamber and spaced apart therein to provide an air gap within said sealed chamber which is in series with said fusible element, said energy-conducting elements being fixedly supported by portions of said sealed chamber, said air gap being adapted to break down on a predetermined voltage to cause flow of current through said fusible element which ruptures said fusible element.

4. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sleeve fixedly mounted on said tube at an end thereof and in alinement therewith, means cooperating with the wall of said sleeve to provide a sealed chamber within said sleeve, energy-conducting elements extended into said sealed chamber and spaced apart therein to provide an air gap within said sealed chamber which is in series with said fusible element, and a tubular element formed of fiber located within said sealed chamber and spaced from the wall of said sleeve and arranged in embracing relation with respect to said air gap, said air gap being adapted to breakdown on a predetermined voltage to cause flow of current through said fusible element which ruptures said fusible element.

5. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sleeve fixedly mounted on said tube at an end thereof and in alinement therewith, means cooperating with the wall of said sleeve to provide a sealed chamber within said sleeve, energy-conducting elements extended into said sealed chamber and spaced apart therein to provide an air gap within said sealed chamber which is in series with said fusible element, and a tubular element formed of fiber located within said sealed chamber and spaced from the wall of said sleeve and provided with a chamfered face arranged in embracing relation with respect to said air gap, said air gap being adapted to break down on a predetermined voltage to cause flow of current through said fusible element which ruptures said fusible element.

6. A cutout comprising a fuse unit movable to open circuit and closed circuit positions, said fuse unit including a tube formed of insulating material, a fusible element located within said tube, said fusible element when in an intact condition serving to retain the fuse unit in the closed circuit position and when ruptured allowing the fuse unit to move to the open circuit position, a sealed chamber located at one end of said tube and in alinement therewith, energy-conducting elements extended into said sealed chamber and spaced apart therein to provide an air gap within the sealed chamber which is in series with said fusible element, said air gap being adapted to break down on a predetermined voltage to cause flow of current through said fusible element which ruptures said fusible element, and an auxiliary switch which is movable to the closed circuit position when the fuse unit moves to the open circuit position and which moves to the open circuit position when the fuse unit moves to the closed circuit position.

7. A cutout comprising a fuse mechanism having open circuit and closed circuit positions, a fuse link in said fuse mechanism adapted when unfused to prevent movement of said mechanism from closed circuit position, but when fused permitting movement of the mechanism to open circuit position, and a dielectric element serially arranged with said fuse and adapted to break down to effect flow of current through the fuse only upon a predetermined voltage.

8. A cutout comprising a movable member having a closed and an open circuit position, a fuse mechanism associated with said movable member, a tensioned fuse link in said fuse mechanism which when unfused prevents movement of said control member from closed circuit position, but which when fused permits movement of the movable member to open circuit position, and a dielectric element serially arranged with said fuse and adapted to break down to effect flow of current through the fuse only upon a predetermined voltage.

9. In a cutout, circuit-connecting conducting means movable in a direction away from circuit-connecting position to disconnecting position, and means including a dielectric member and a fuse link associated with said conducting means, the dielectric member being serially arranged with said fuse link and adapted to break down to effect flow of current through the fuse link only upon a predetermined voltage, the fuse link restraining the movement of the conducting means when unfused, but when fused by means of said current permitting movement thereof to disconnecting position.

10. In a cutout, a movable element, circuit-connecting conducting means carried thereby, means biasing the movable element in a direction away from circuit-connecting positions to a disconnecting position, and means including a dielectric member and a fuse link carried by said movable element, the dielectric member being serially arranged with said fuse link and adapted to break down to effect flow of current through the fuse link only upon a predetermined voltage, the fuse link restraining the movement of the movable element when unfused, and when fused by means of said current permitting said biasing means to become operative to move the movable element from connecting to disconnecting position.

11. In a cutout, a movable mechanism, circuit-connecting conducting means supported thereby, means for biasing the movable mechanism in a direction away from circuit-connecting position to a disconnecting position, and means including a dielectric member and a fuse link carried by said mechanism, the dielectric member being serially arranged with said fuse link and adapted to break down to effect flow of current through the fuse link only upon a predetermined voltage, the fuse link restraining the movement of the mechanism when unfused, and when fused permitting said biasing means to become operative to move the mechanism to disconnecting position, said dielectric element being calibrated to determine the voltage at which current shall effect fusing of said link.

12. In a cutout, a movable element, circuit-connecting conducting means supported thereby, a mechanism associated with said movable element whereby it is movable, means biasing the movable element and mechanism in a direction away from circuit-connecting position to disconnecting position, and means including a dielectric member and a fuse carried with said movable element, the dielectric member being serially arranged with said fuse link and adapted to break down to effect flow of current through the fuse link only upon a predetermined voltage, the fuse restraining the mechanism in circuit connecting position when unfused, and when fused permitting said biasing means to become operative to force the mechanism and movable element to disconnecting positions, said dielectric element being calibrated to determine the voltage at which current shall effect fusing of said fuse link.

13. In a cutout, a movable element, electrically parallel conducting means carried thereby having with said movable element a circuit connecting position and a disconnected position, and means including a dielectric element and a fuse link serially arranged therewith and shunting across said conducting means, said fuse link being carried by said movable element and adapted to restrain the movement thereof to disconnecting positions when the fuse is unfused, the dielectric element being adapted to withstand normal voltages to prevent current flow through the fuse under conditions when it is desired to have said conducting means in connected position, but to break down under voltages corresponding to a condition in which it is desirable to have said conducting means in disconnecting position.

14. In a cutout, a movable tube of insulating material, conducting means which is in a circuit-connecting position in one position of said tube and in a circuit-disconnecting position in another position of said tube, a fuse link and a dielectric element, the fuse link passing through the tube, means connecting said fuse link in series relation with said dielectric element, and means responsive to the electrical failure of said dielectric element and blowing of said fuse link to effect movement of said movable tube to effect a disconnected position of said conducting means.

15. A cutout comprising a movable element of insulating material, an electrical contact thereon, means comprising an unfused link associated with said insulating element for holding the latter in a normally closed circuit position of said contact, a dielectric element, means connecting said fuse link in series circuit relation with said dielectric element, said dielectric element being responsive to excess voltage to pass current through the fuse link to blow the same, whereby it can no longer hold the insulating element and contacts thereon in circuit closing position.

16. A cutout comprising movable engaging contacts adapted to assume engaging positions, means biasing said contacts away from engaging positions, means comprising a fuse link adapted to hold said contacts in engaging positions against said biasing means, a dielectric element in series with said fuse link, said dielectric element being responsive to only a predetermined voltage to permit flow of current through said fuse link, said fuse link being responsive to flow of current therethrough to melt and thereby to release said contacts to be biased by said biasing means away from contacting positions.

17. A cutout comprising movable switch element adapted to assume a connected position and disconnected position, means for latching said switch into connected position, a fuse link associated with the latching means and adapted to maintain the latched position of the same when unfused and when fused to release the same to unlatched position, said fuse being responsive to current to fuse, and voltage responsive means in series with said fuse link normally preventing current flow through the link but under abnormal voltage conditions permitting said current flow.

18. A cutout comprising a mechanism having two positions, contacts carried thereby having in one position of the mechanism a circuit closing position and in the other position of the mechanism a circuit opening position, mechanically tensioned means which by its tension holds the mechanism in circuit closing position of said contacts, said tensioned holding means being responsive to certain current flow to have the tension released and to release the mechanism for movement to open circuit position of said contacts, and dielectric means in series with said holding means which resists current flow therethrough under normal voltage, but which permits flow of said current therethrough under abnormal voltage whereby said tension and said mechanism is released.

19. A cutout comprising a mechanism having a latched and an unlatched position, contacts carried thereby having in the latched position of the mechanism a circuit closing position and in the unlatched position of the mechanism a circuit opening position, means biasing the mechanism to open circuit position, mechanically tensioned means which by its tension holds the mechanism latched in circuit closing position of said contacts and against said biasing means, said tensioned holding means being responsive to current flow to have the tension therein released and to unlatch the mechanism for movement in response to said biasing means to open circuit position of said contacts, and dielectric means in series with said holding means which resists current flow therethrough under normal voltage, but which permits flow of said current under abnormal voltage.

GEORGE W. GOLDNER.